J. A. Dodge.
Harvester Rake.
No. 2905
Reissued Mar. 31, 1868.
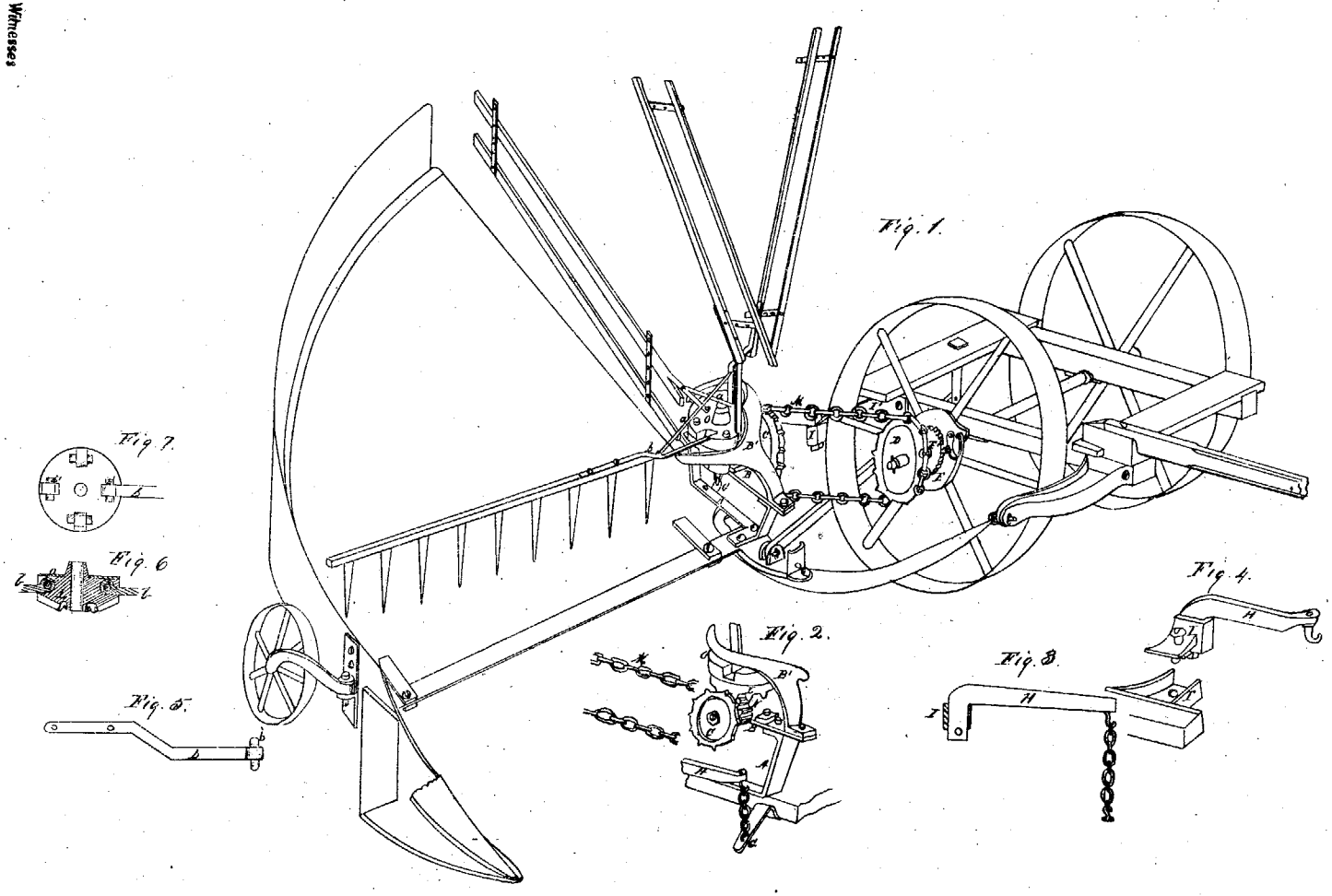
Witnesses
C. T. Dodge
W. S. McCall
Inventor.
John A. Dodge
By W. C. Dodge
Attorney.

UNITED STATES PATENT OFFICE.

JOHN A. DODGE, OF AUBURN, NEW YORK.

IMPROVEMENT IN HARVESTERS.

Specification forming part of Letters Patent No. 55,837, dated June 26, 1866; reissue No. 2,905, dated March 31, 1868.

DIVISION B.

*To all whom it may concern:*

Be it known that I, JOHN A. DODGE, of Auburn, in the county of Cayuga and State of New York, have invented certain new and useful Improvements in Harvesters, of which the following is a full, clear, and exact description, reference being had to the accompanying drawings, which make part of this specification, and in which—

Figure 1 represents a view in perspective of so much of a harvester to which my improvements are applied as is necessary to illustrate my invention. Fig. 2 represents a similar view of a portion of the mechanism for supporting and driving the rake, as seen from the rear outer or stubble side of the machine. Fig. 3 represents a view, partly in elevation and partly in section, of the device for supporting the stubble end of the platform. Fig. 4 represents a view in perspective of the same. Fig. 5 represents a plan or top view of one of the rake-arms detached. Fig. 6 represents a vertical central section through the crown-wheel which carries the rake-arms, and Fig. 7 represents a plan or top view of the same.

My invention relates to that class of harvesters having a combined rake and reel revolving on a vertical axis mounted on a finger-beam or platform attached to but vibrating independently of the main frame; and the improvements herein claimed consist, first, in a novel method of mounting the combined rake and reel on the platform; second, in a novel method of attaching the beaters to the crown-wheel with which they revolve; third, in a novel method of driving the rake; fourth, in a novel method of supporting the rake and platform.

In the accompanying drawings, which show only the parts of a completely-organized machine necessary to illustrate my invention, a suitable main frame is shown as supported on two driving-wheels turning loosely on the axle. An arm projecting from the inner front corner of this frame supports a drag-bar, to which a finger-beam and shoe are attached in any well-known way. A coupling-arm, hinged to the shoe and to the rear of the main frame in the ordinary way, counteracts the lateral pressure of the cutting apparatus. A sector-shaped platform is bolted to the finger-beam, and supported by a grain-wheel in the usual way. In order to sustain the stubble end of the platform, raking devices, and cutting apparatus at a uniform height from the ground, I secure a trough-shaped bracket, I′, Fig. 4, to the main frame at or near its inner rear corner. A corresponding socket, I, fits into this bracket, and is secured to it by a screw passing through holes in the socket and bracket. By this means the parts can easily be removed or replaced, and yet are securely held when locked together. An arm, H, is made at one end to fit into the socket I, where it is held by a pin. This arm projects backward from the frame toward the platform, and carries a hook at its outer end, as shown in Figs. 2 and 3. A chain is attached to an arm, G, projecting from the platform, and one of its links is fastened on the hook. The platform can be raised or lowered, as desired, by changing the links. The rake is supported on an iron frame secured upon the inner front corner of the platform. This frame consists of a bar, A, bent upward at each end. These ends are then turned inward a short distance to support a cross-bar, B, which projects beyond and is bolted to each end of the standards above described, as shown in Figs. 1 and 2. This bar acts as a brace to stiffen the platform. The cam-guide B′, which controls the movements of the rake and reel arms, is supported on standards bolted to the ends of this bar B. The cam and its standards thus form an arch, which secures a firm support for the rake. A vertical stud or spindle, resting on the bar B, forms the axis of a crown-wheel, L, having cross-shaped grooves in its top, in which the cross-heads on the ends of the rake and beater-arms fit. A plate, O, having radial slots over the arms, is bolted to the top of the crown-wheel. The rake and beater arms are thus free to rise and fall, and yet are held securely in their places. Each one of the arms *b* is linked to the one diametrically opposite it by links *a*, so that as one arm is lifted or turned up by the cam B′, the other is held down close to the platform over which it is passing.

The arms which carry the beaters are straight, but the rake-arm $b^1$ has a bend, $b^2$, in it, for the purpose of enabling it to throw the grain farther back in raking off. The rake is driven by a sprocket-wheel, D, turning loosely on the main axle. A ratchet-wheel secured to the sprocket-wheel is engaged by a pawl, *e*, pivoted on a plate, E, bolted to the inner driving-wheel. The driving-wheel is thus thrown into gear with the sprocket-wheel, but is released in backing. A flat-linked chain, M, embraces the sprocket-wheel, and drives a sprocket-wheel, G, carrying a head-pinion, M, which engages with a head-gear on the under side of the crown-wheel, and thus drives the rakes.

What I claim is—

1. The frame A, attached to the platform, and arranged to support the rake and beater arms, substantially as set forth.

2. The combination, substantially as set forth, of a continuously-revolving crown-wheel, carrying rake and reel arms, with the frame or standard A, for the purpose described.

3. The combination of the cam B′ and bed-piece B with the frame A, these parts being constructed and arranged for joint operation, as set forth.

4. Pivoting the rake and reel arms to the crown-wheel L by means of the cross heads or bars *b*, fitting into suitable cavities in the wheel L, and held in place by the plate O, substantially as shown and described.

5. The combination, substantially as set forth, of the detent-plate E and ratchet-plate E′ with the sprocket-wheel D, chain M, and pulley C, for the purpose set forth.

6. The combination, substantially as described, of the bracket I, socket I′, and overhanging arm H, for the purpose set forth.

7. The combination, substantially as described, with the overhanging arm H, of the chain P and arm G, to support the inner end of the platform.

JOHN A. DODGE.

Witnesses:
H. S. STEVENSON,
A. C. MUNGER.